United States Patent Office 3,642,890
Patented Feb. 15, 1972

3,642,890
ARYL ETHER THIOANHYDRIDES
Stanley B. Mirviss, Stamford, Conn., and Carl C. Greco, Garnerville, and Walter Stamm, Tarrytown, N.Y., assignors to Stauffer Chemical Company, New York, N.Y.
No Drawing. Filed Jan. 6, 1969, Ser. No. 789,403
Int. Cl. C07c 153/01
U.S. Cl. 260—545 R     12 Claims

ABSTRACT OF THE DISCLOSURE

Vinyl polymer compositions are stabilized against degradation and discolorization due to heat by adding to the polymer a stabilizing amount of a novel compound of the formula:

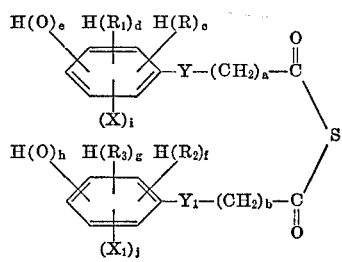

wherein Y and $Y_1$ are independently selected chalcogens with a molecular weight between 13 and 38, R, $R_1$, $R_2$, and $R_3$ are independently selected divalent hydrocarbon groups consisting essentially of carbon and hydrogen containing from 1 to about 12 carbon atoms. X and $X_1$ are halogen, $a$ and $b$ are independently selected integers having a value from 1 to about 4 inclusive, $c$, $d$, $e$, $f$, $g$, and $h$ are integers having a value zero or 1, $i$ is an interger having a value of from zero to $[4-(c+d+e)]$ inclusive and $j$ is an integer having a value of from zero to $[4-(f+g+h)]$ inclusive.

BACKGROUND OF THE INVENTION

The present invention relates to a new class of aryl ether thiolanhydride compounds and to vinyl polymer compositions having incorporated therein these new aryl ether thiolanhydride compounds to impart heat stability to the polymer composition.

SUMMARY OF THE INVENTION

According to the present invention there is provided novel compounds of the formula:

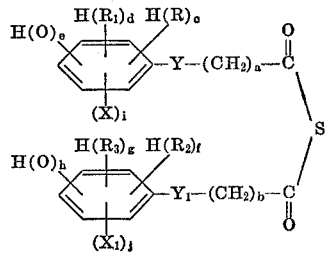

wherein Y and $Y_1$ are independently selected chalcogens with a molecular weight between 13 and 38, R, $R_1$, $R_2$, and $R_3$ are independently selected divalent hydrocarbon groups consisting essentially of carbon and hydrogen containing from 1 to about 12 carbon atoms; X and $X_1$ are halogen, $a$ and $b$ are independently selected integers having a value of from 1 to about 4, $c$, $d$, $e$, $f$, $g$, and $h$ are integers having a value from zero to one inclusive, $i$ is an integer having a value from zero to $[4-(c+d+e)]$ inclusive and $j$ is an integer having a value of from zero to $[4-(f+g+h)]$ inclusive; and heat stable compositions comprising the novel compounds and vinyl polymers.

The present invention provides a novel class of compounds which are found to be particularly effective as heat stabilizers in vinyl polymers such as the polyvinyl halides, polyvinylidene halides, polyethylene, polypropylene, acrylonitrile - butadiene - styrene compositions, chlorinated polyethylene, copolymers made from monomers one of which at least is a halogen containing monomer, and post chlorinated polymers.

DETAILED DESCRIPTION OF THE INVENTION

The term divalent hydrocarbon group consisting essentially of carbon and hydrogen containing from 1 to about 12 carbon atoms is used herein to denote a radical which with the addition of two hydrogen atoms is converted to a paraffinic, cycloparaffinic or aromatic molecule. It is understood that such radicals can contain certain substituents, but such substituents must be present in such a manner that they do not substantially change the nature of the hydrocarbon group. The hydrocarbon groups can contain nitrogen, oxygen sulfur or halogen. For example, chlorine or bromine can be present as substitutents on the hydrocarbon radical or oxygen can be present in an ether group.

Examples of divalent hydrocarbon groups consisting essentially of carbon and hydrogen which are representative of R, $R_1$, $R_2$ and $R_3$ in the practice of the present invention are as follows:

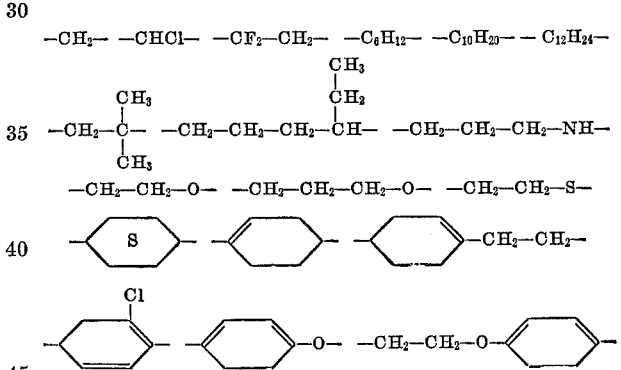

The above examples are illustrative only and are not intended to encompass all possible groups which can be useful in the practice of the present invention.

The term halogen as used herein is intended to mean fluorine, chlorine, bromine, or iodine.

The substituents R, $R_1$, $R_2$, $R_3$, X, and $X_1$ and the subscripts $a$, $b$, $c$, $d$, $e$, $f$, $g$, $h$, $i$, and $j$ can be the same or different.

It is to be understood that when either $i$ or $j$ is less than its maximum possible value $[4-(c+d+e)]$ or $$[4-(f+g+h)]$$

the remaining number of possible positions are filled by hydrogen.

Compounds suitable for use in accordance with the present invention include:

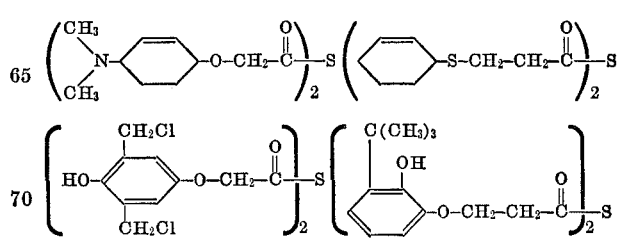

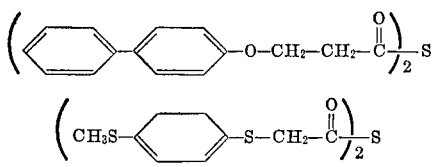

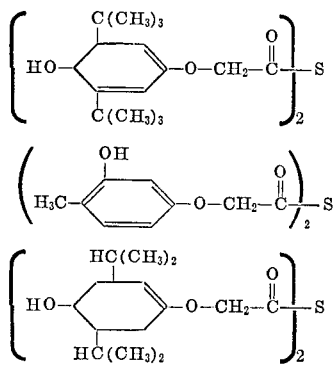

The novel compounds of the present invention are particularly effective stabilizing agents when the aryl group is substituted with a hydroxyl group and one or two alkyl, alkoxy, or halogen moieties in an ortho position thereto. The compounds are even more effective when the hydrocarbon radicals substituted in an ortho position to the hydroxyl group contain from 3 to 6 carbon atoms and are particularly effective when the hydrocarbon radicals have more than one carbon atom attached to the carbon atom which is linked to the phenyl ring.

The preferred compounds for use in the practice of the present invention include:

The novel thiolanhydrides of the present invention can be prepared in good yields by reacting a thiolic acid and an acyl chloride in a suitable solvent at from 0° C. to about 120° C. The temperature range depends upon the particular reactants involved and the solvent employed. The reaction may be carried out at from subatmospheric to superatmospheric pressure. Provision, must however, be made for removal of the HCl formed from the reaction. This may be accomplished by the use of an acid acceptor such as pyridine or when operating near atmospheric pressure by the use of an inert gas purge through the system.

Solvents suitable for the reaction are aromatic solvents such as benzene, toluene, xylene, chlorinated solvents such as chloroform, carbon tetrachloride, and chlorobenzene, paraffinic solvents such as heptane, hexane or cyclohexane and solvents such as tetrahydrofuran.

For example, phenoxyacetylthiolanhydride can be prepared by reacting phenoxyacetyl chloride and phenoxythiolacetic acid in benzene at reflux temperatures. The reaction is complete when no HCl is observed coming from the system, the benzene is removed and the phenoxythiolacetic anhydride is crystallized.

The acyl chlorides useful for the practice of the present invention can be prepared by the reaction of the desired acid with phosphorus trichloride.

The thiolacid [RC(O)SH] can be prepared by reacting an acyl chloride with $H_2S$ in an anhydrous acid acceptor such as pyridine at from 0° C. to about 120° C. Preferably from about 0° C. to about 30° C.

The term vinyl polymer as used herein denotes those solid homopolymers, copolymers, terpolymers, and post chlorinated polymers which require heat stabilization made from ethylenically unsaturated monomers by an addition polymerization reaction.

Included within the definition of ethylenically unsaturated materials useful in the preparation of polymers suitable for the practice of the present invention are the vinyl halide monomers of the formula:

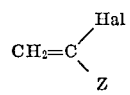

wherein Z can be selected from halogen or hydrogen and Hal is halogen, for example, vinyl chloride, vinyl bromide, vinylidene chloride, and the like; mono-olefinic hydrocarbons such as ethylene and propylene; styrene and its nuclear, alpha-alkyl or aryl substituted derivatives such as p-methyl or butyl styrene; alpha-methyl or propyl styrene; phenyl styrene and halogenated styrenes such as alpha-chlorostyrene; mono-olefinically unsaturated esters including vinyl esters, e.g., vinyl acetate, vinyl stearate and vinyl benzoate; alkyl methacrylates, e.g. methyl and propyl methacrylate; alkyl crotonates; alkyl acrylates, e.g., methyl acrylate, hydroxy ethyl acrylate, and tertiary butylamino acrylate; isopropenyl esters; isopropenyl halides; vinyl esters of halogenated acids; alkyl and methallyl esters; esters of alkenyl alcohols; haloalkyl acrylates; alkyl alpha-cyano acrylates; maleates, e.g., monomethyl maleate, diethyl maleate; fumarates, e.g., monoethyl fumarate and dimethyl fumarate; diethyl glutaconate; mono-olefinically unsaturated organic nitriles such as fumaronitrile, acrylonitrile and methacrylonitrile; mono-olefinically unsaturated carboxylic acids such as cinnamic, maleic and fumaric and maleic anhydride and the like. Amides of these acids are also useful. Vinyl ethers and vinyl alkyl ethers, vinyl sulfides such as vinyl chloroethyl sulfide can also be utilized. Diolefinically unsaturated hydrocarbons containing two olefinic groups in conjugated relation and the halogenated derivatives such as butadiene-1,3 and 2 chloro-butadiene-1,3, can also be utilized in preparation of suitable polymer compositions.

The term vinyl halide polymer, ethylene polymer and propylene polymer are used herein to denote homopolymers, copolymers and terpolymers of the named monomer and suitable monomers which can be polymerized by an addition polymerization reaction. The following are examples of copolymers which can be used in the practice of the present invention: vinyl chloride-vinyl acetate, vinyl chloride-vinylidene chloride, vinyl chloride-acrylonitrile, vinyl chloride-maleate esters, vinyl chloride-vinyl ethers, vinyl chloride-ethylene, vinyl chloride-propylene, ethylene-vinyl acetate, ethylene-acrylonitrile. The examples are illustrative only and are not intended to be exhaustive of the many copolymers whose stability can be enhanced by the compounds of the present invention.

The proportion of the aryl ether thiolanhydride of the present invention which must be employed to make satisfactory heat stabilized compositions will vary over a wide range depending upon the particular vinyl polymer, the degree of stabilization needed, the end use of the resin, the presence of plasticizers and co-stabilizing additives, as well as the time and temperature requirements of the final processing. The presence of a stabiilzing amount of from about 0.01% to about 15% by weight of the compounds of the present invention will be sufficient for most applications, although the preferred range is from about 0.5% to about 7.0% by weight of compounds of the present invention based on the weight of the polymer.

The compounds of the present invention can be advantageously employed in combination with co-stabilizing additives known in the art. The preferred co-stabilizing additives are the organic phosphites, dialkyl and diaryl phosphonates, organic and inorganic sulfites such as $Na_2SO_3$, $NaHSO_3$ and $(RO)_2SO$ where R is an alkyl or arylalkyl radical, zinc soaps, phenolic antioxidants, mercaptides, organotin compounds such as dialkyltin carboxylates or mercaptides, alkylstannoic acid and alkylthiostannoic acid.

The compounds of the present invention can be incorporated into the polymer composition by methods familiar to one skilled in the art for the addition of similar materials to polymer blends such as by mixing in a ribbon mixer or by the intensive mixing of a Henschel™ or Welex™ mixer.

The novel compounds of the present invention can be prepared in accordance with procedures known in the art, as well as by the procedures of the following examples:

EXAMPLE 1

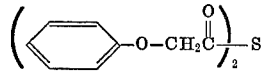

Step 1.—Preparation of phenoxythiolacetic acid

To 200 grams of pyridine saturated with H₂S below 10° C. at atmospheric pressure were added 50 grams (0.294 mole) of phenoxyacetyl chloride and 70 grams (2.1 moles) of hydrogen sulfide. The H₂S was added continuously and the phenoxyacetyl chloride was added dropwise over a 1½ hour period. The H₂S addition continued for 2 hours. The temperature was maintained below 10° C. during the addition of the reactants. A nitrogen purge was passed through the reaction mixture during the procedure. The reaction mass was allowed to stand at 10° C. overnight. The reaction mixture was transferred to a 2 liter flask and acidified by the dropwise addition of 865 cubic centimeters of water and 210 cubic centimeters of concentrated H₂SO₄ while the mixture was maintained below 10° C. To the aqueous solution was added 300 cubic centimeters of chloroform and the mixture brought to room temperature. The organic layer was separated from the aqueous layer, and stripped at reduced pressure. A yellow oil in the amount of 42 grams remained. The oil was phenoxythiolacetic acid. The yield was 85%.

Step 2.—Preparation of phenoxythiolacetic anhydride

Without any purification 38 grams of the thiol acid prepared in Step 1 were dissolved in 250 cubic centimeters of benzene at room temperature. A gas inlet tube was passed into the solution and a moderate nitrogen purge passed through the system. Phenoxyacetyl chloride in the amount of 38 grams was added to the system at room temperature and the reaction mixture refluxed for 5 hours. At the end of this time no more HCl was observed coming from the system.

The reaction mixture was stripped under vacuum to remove low boiling material and an orange oil remained. Upon standing the product crystallized. The solid was removed and then crystallized from cyclohexane. The solid had a melting point 25–28° C.

Analysis for

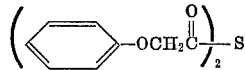

Theoretical S (percent): 10.6.
Found S (percent): 10.11.

EXAMPLE 2

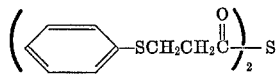

Beta-thiophenylpropionic thiolanhydride is prepared by reacting beta-thiophenylpropionic thiolacid with beta-thiophenylpropionoyl chloride.

Step 1.—Preparation of beta-thiophenylpropionoyl chloride

To 108 grams of acrylic acid in 500 cubic centimeters of benzene are slowly added 165 grams of thiophenol. The reaction mixture is held at 25° C. for 3 hours in the presence of ultra violet light. At the end of three hours, the benzene is stripped from the system.

To 70 grams of phosphorus trichloride is slowly added 212 grams of thiophenylpropionic acid prepared as above. The mixture is reacted with agitation at 90° C. for 3 hours. When agitation is stopped, two layers form. The top layer contains the beta-thiophenylpropionoyl chloride.

Step 2.—Preparation of beta-thiophenylpropionic thiolacid

Pyridine in the amount of 200 grams is saturated with H₂S at 10° C. A nitrogen purge is started through the system and 80 grams (0.4 mole) of beta-thiophenylpropionoyl chloride is slowly added to the system over a 1½ hour period. H₂S in the amount of 70 grams (2.1 mole) is continuously added to the system during the addition of the beta-thiophenylpropionoyl chloride and continued for ½ hour after all the propionoyl chloride has been added. The temperature of the reaction mixture is held below 10° C. during the addition of the reactants. The reaction mixture is held for 16 hours at 10° C. under a nitrogen atmosphere. The reaction mixture is transferred to a 2 liter flask and acidified by the dropwise addition of 900 cubic centimeters of water and 200 cubic centimeters of concentrated sulfuric acid. The mixture is maintained below 10° C. during the addition of the sulfuric acid. The mixture is extracted with 300 cubic centimeters of chloroform and brought to room temperature. The organic layer is separated from the aqueous layer and the chloroform is stripped at reduced pressure. The material that remains is beta-thiophenylpropionic thiolacid.

Step 3.—Preparation of beta-thiophenylpropionic thiolanhydride

Without any further purification 52 grams of thiolacid prepared in the previous step is dissolved in 250 cubic centimeters of benzene. A gas inlet tube is passed into the solution and a moderate nitrogen purge passed through the system. Beta-thiophenylpropionoyl chloride in the amount of 50 grams is added to the system at room temperature and the reaction mixture is refluxed until no HCl is observed coming from the system.

The reaction mixture is stripped of low boiling material under vacuum and the thiolanhydride crystallized from the remaining material. The crystallized material is separated and purified by crystallization from a solvent.

EXAMPLE 3

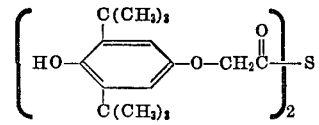

Step 1.—Preparation of 2,6-di-tertiarybutyl-1-hydroxy-4-phenoxyacetyl chloride

To 500 cubic centimeters of benzene at room temperature is added 122 grams (0.5 mole) of 2,6-di-tertiarybutyl-1-hydroxy-4-sodium phenoxide. To this mixture is added 47.3 grams (0.5 mole) of chloroacetic acid. After refluxing for 8 hours, the reaction mixture is filtered to remove the sodium chloride formed. The benzene can be removed by stripping at low pressure. The residue which remains is 2,6-di-tertiarybutyl-1-hydroxy-4-phenoxyacetic acid.

To 30 grams of phosphorus trichloride is slowly added 112 grams of the 2,6-di-tertiarybutyl-1-hydroxy-4-phenoxyacetic acid prepared above. The reaction mixture is agitated at 90° C. for 5 hours. When the agitation is stopped, two layers form. The top layer contains 2,6-di-tertiarybutyl-1-hydroxy-4-phenoxyacetyl chloride.

Step 2.—Preparation of 2,6-di-tertiarybutyl-1-hydroxy-4-phenoxyacetic thiolacid

A nitrogen purge is slowly passed through 200 grams of pyridine saturated with H₂S at 10° C. and at atmospheric pressure. H₂S is slowly started to bubble through the pyridine. Over a period of 1½ hours, 45 grams of the 2,6-di-tertiarybutyl-1-hydroxy-4-phenoxyacetyl chloride prepared in the previous step is slowly added to the reactor. The temperature is maintained below 10° C. The H₂S is continuously bubbled through the reaction mixture during the addition and for ½ hour after the 2,6-di-tertiarybutyl-1-hydroxy - 4 - phenoxyacetyl chloride has been added to the system. The reaction mixture is held under a nitrogen atmosphere for 16 hours at 10° C. The reaction is transferred to a 2 liter flask and acidified by the dropwise addition of a mixture of 900 cubic centimeters of water and 230 cubic centimeters of concentrated sulfuric acid. The mixture is maintained below 10° C. during the addition of the sulfuric acid. The mixture is extracted with 300 cubic centimeters of chloroform and brought to room temperature. The organic layer is separated from the aqueous layer and the chloroform is stripped at reduced pressure. The material that remains contains 2,6 - di-tertiarybutyl-1-hydroxy-4-phenoxyacetic thiolacid.

Step 3.—Preparation of 2,6-di-tertiarybutyl-1-hydroxy-4-phenoxyacetic thiolanhydride The 2,6 - di-tertiarybutyl - 1-hydroxy-4-phenoxyacetic thiolanhydride is prepared by reacting the corresponding thiolacid prepared in Step 2 with the corresponding phenoxyacetyl chloride prepared in Step 1 according to the method of Example 1 or Example 2.

The utility of the compounds of the present invention can be determined from tests of compositions.

The heat stabilized polymeric materials of the present invention can be produced by admixing a suitable amount of a thiolic anhydride compound of the present invention and a polymeric resin together with other additives and then blending the mixture by a suitable means known in the art for that purpose.

The following example is presented to illustrate the method of testing the utility of the compounds of the present invention.

EXAMPLE 4

Compositions of the polymers set forth are prepared by mixing 3.0% by weight of the individual stabilizer set forth into the particulate polymer by a means suitable for the polymer being tested. After mixing, the stabilized composition is tested by conventional milling on a heated two roll mill to determine heat stability. The mill rolls are heated to a temperature sufficient to permit milling of the polymer and sufficiently high to degrade unstabilized polymer in two hours. Samples are taken from the mill every 10 minutes and evaluated. Unmilled samples are fluxed to form a homogenous composition and are aged at ambient temperatures. The stabilizer compounds of this invention are found to provide enhanced stabilization to the polymers.

POLYMER

In a manner similar to that described above the stabilizers indicated below are evaluated successfully in the following polymer systems.

(1) Polyethylene (density .915)
(2) Polyethylene (density .945)
(3) Polypropylene.
(4) Polyvinyl chloride.
(5) Polyvinylidenechloride.
(6) Styrene-acrylonitrile-butadiene copolymer (ABS Type B).
(7) Styrene-acrylonitrile-butadiene copolymer (ABS Type G).

STABILIZERS (A) Phenoxyacetic thiolanhydride.
(B) Beta-thiophenylpropionic thiolanhydride.
(C) 2,6-di-tertiarybutyl-1-hydroxy-4-phenoxyacetic thiolanhydride.

What is claimed is:
1. Compounds of the formula:

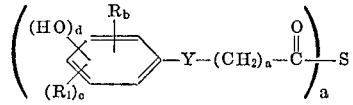

wherein Y is a chalcogen selected from the group consisting of sulfur and oxygen; wherein R and $R_1$ are hydrocarbon groups containing from 1 to 12 carbon atoms; wherein $a$ is an integer having values of from 1 to 4 inclusive; and wherein $b$, $c$ and $d$ independently are integers having a value of zero to one inclusive.
2. The compounds of claim 1, wherein Y is oxygen.
3. The compounds of claim 1, wherein Y is sulfur.
4. The compounds of claim 2, wherein $b$ is zero.
5. The compounds of claim 3, wherein $b$ is zero.
6. The compounds of claim 2, wherein $a$ is one.
7. The compounds of claim 3, wherein $a$ is one.
8. The compound:

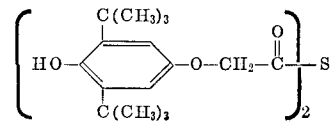

according to claim 1.
9. The compound:

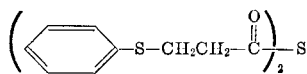

according to claim 1.
10. The compound:

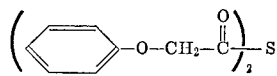

according to claim 1.
11. The compound:

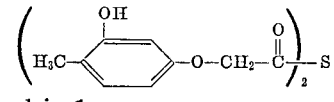

according to claim 1.
12. The compound:

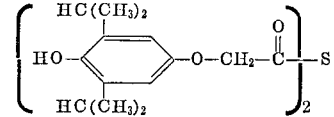

according to claim 1.

References Cited

UNITED STATES PATENTS 3,466,307  9/1969  Stamm et al. _____ 260—399

FOREIGN PATENTS 115,538  7/1965  Czechoslovakia _____ 260—373

LEWIS GOTTS, Primary Examiner
R. GERSTL, Assistant Examiner

U.S. Cl. X.R.

260—45.7 S, 45.95, 502.6, 544 M

UNITED STATES PATENT AND TRADEMARK OFFICE
CERTIFICATE OF CORRECTION

PATENT NO. : 6,342,890 B1
DATED : January 29, 2002
INVENTOR(S) : Martin T. Shetter It is certified that error appears in the above-identified patent and that said Letters Patent is hereby corrected as shown below:

Column 8,
Line 14, change "processors)" to -- processor(s) --
Line 14, change "processors)" to -- processor(s) --

Column 25,
Line 53, change "t e" to -- the --

Signed and Sealed this

Twenty-first Day of May, 2002

Attest:

Attesting Officer

JAMES E. ROGAN
Director of the United States Patent and Trademark Office